Dec. 9, 1930. O. RENSONNET 1,784,466
STEERING SIGHT ADAPTED TO BE FITTED TO THE MUDGUARDS OF MOTOR VEHICLES
Filed Dec. 26, 1929 3 Sheets-Sheet 2
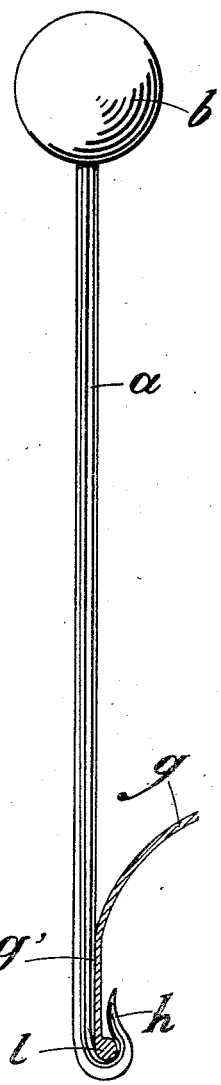
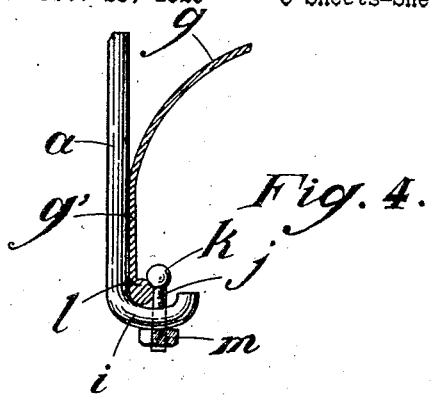
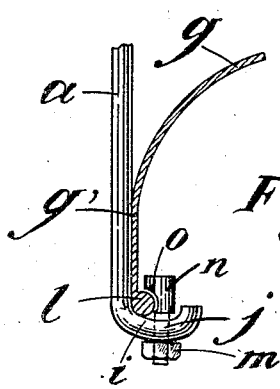
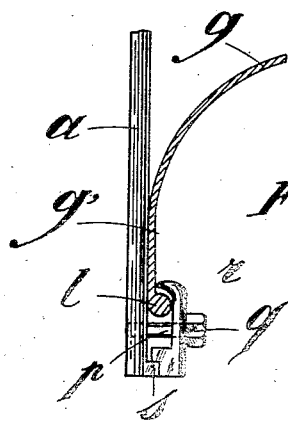

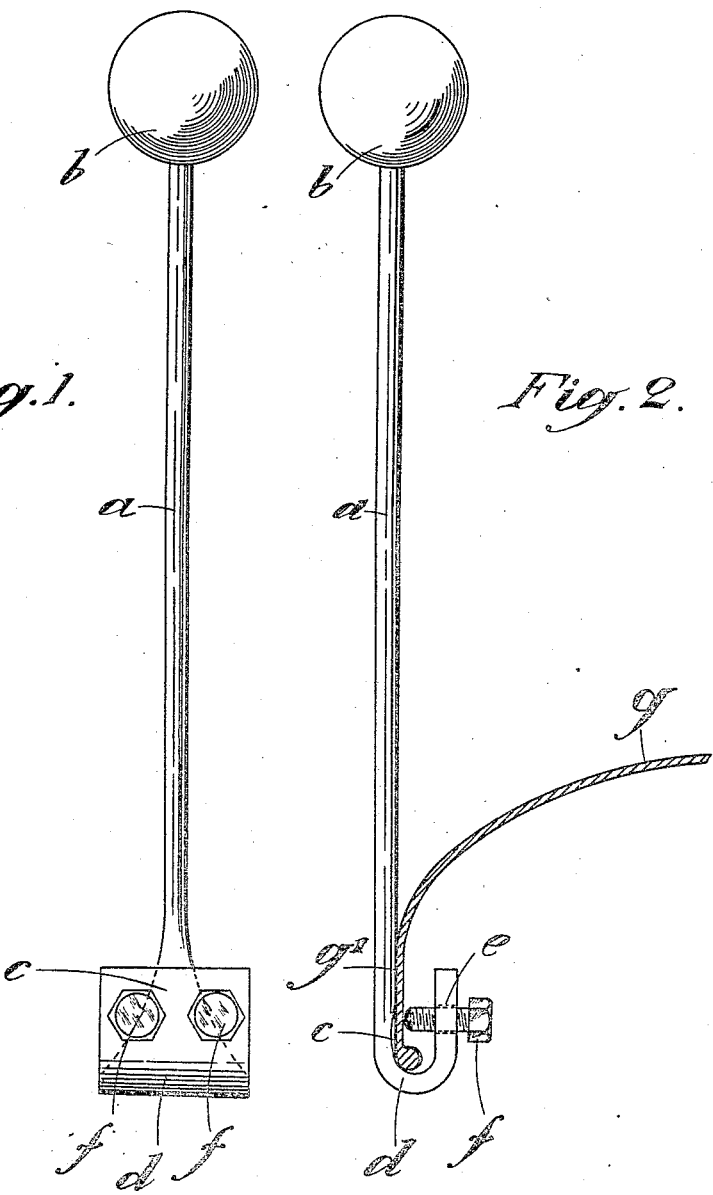

Dec. 9, 1930.  O. RENSONNET  1,784,466
STEERING SIGHT ADAPTED TO BE FITTED TO THE MUDGUARDS OF MOTOR VEHICLES
Filed Dec. 26, 1929  3 Sheets-Sheet 3
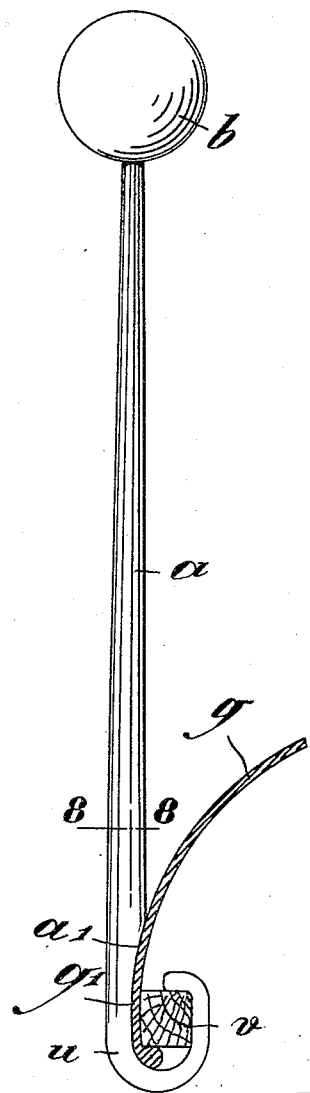
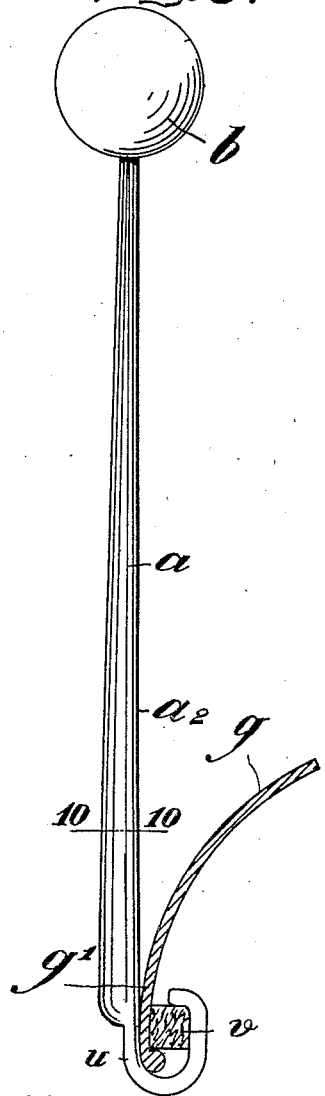
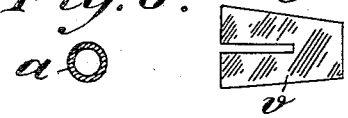
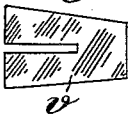
Inventor
Oscar Rensonnet
By B. Singer, atty.

UNITED STATES PATENT OFFICE

OSCAR RENSONNET, OF ETTERBEEK-BRUSSELS, BELGIUM, ASSIGNOR TO HENRY DUJARDIN, OF NEW YORK, N. Y.

STEERING SIGHT ADAPTED TO BE FITTED TO THE MUD GUARDS OF MOTOR VEHICLES

Application filed December 26, 1929, Serial No. 416,720, and in Belgium February 11, 1929.

I have filed applications for patent in Belgium February 11, 1929; June 8, 1929; and November 16, 1929; and in Great Britain November 7, 1929.

My invention relates to a device adapted for use as steering sight or designed to indicate the location of the mudguards in a motor vehicle.

According to the present invention, the aforesaid device comprises a rod or arm carrying at its upper end a sight or aimer and having its bottom portion preferably curved to form a hook and adapted to engage the wing of the mudguard by merely pinching or by means of suitable clamping devices.

By simple way of example, several embodiments of the invention will be hereinafter described with reference to the accompanying drawings in which:

Fig. 1 is an elevation of a steering sight or aimer according to the present invention, Fig. 2 is a side view showing the device as being fixed to the wing of a mudguard, Figs. 3 to 11 are modifications and detail views.

As shown in Fig. 1, $a$ indicates the rod carrying the usual sight or aimer $b$.

The rod or sight carrier $a$ is provided at its bottom with a flattened portion $c$ curved to form a hook $d$ and provided with tapped holes $e$ adapted to receive screws $f$ or the like.

As shown in Fig. 2, the reinforced edge $g'$ of the wing $g$ of the mudguard is engaged by the curved portion $d$ of the rod and suitably clamped by the screws $f$.

As shown in Fig. 4 the rod $a$ terminates by a curved portion $i$ carrying a bolt $j$ having a head $k$ which may be pressed against the bead $l$ of the edge of the wing $g$ by screwing a nut $m$ bearing against the curved portion $i$, thus suitably clamping the rod $a$ against the edge $g'$ of the wing.

In the embodiment shown in Fig. 5 the bolt $j$ instead of carrying a head $k$ is provided with a block or body $n$ recessed at $o$ so as to embrace the outline of bead $l$.

According to the modification shown in Fig. 6 the rod $a$ is provided at its bottom end with a screw bolt $p$ passing across a removable clamp $r$ having its lower end provided with a stop $s$ the head $q$ of the screw bolt $p$ applying and pressing the said clamp against a corresponding end stop $t$ integral with the rod $a$ and against the bead $l$ and, eventually the edge $g'$ of the wing of the mudguard.

According to the embodiments shown in Figs. 7 and 9, the rod carrying the sight may be tapered (Fig. 7) or formed with a flattened side portion, as shown in Fig. 10.

In these embodiments the bottom end of the rod $a$ is bent so as to form a hook $u$ engaging the underside of the wing of the mudguard, by means of an interposed, preferably elastical coin, block or wedge $v$ (Fig. 11) adapted to efficiently secure the sight carrier to the mudguard.

It will be understood that besides the embodiments described and shown herein, any other convenient means for securing the device to the mudguard may be employed, such as welding, brazing, riveting, or screwing, while perforation of said mudguard may be involved or not.

Moreover, the device according to the invention may be made of metal or any other convenient material, solid or hollow. Further the sight carrier may be cylindrical or tapered or of triangular, square or polygonal section or it may be of any different decorative or artistical shape. Further, the rod may be rigid, flexible or semi-flexible; it may be telescopic or it may entirely or partly consist of a spring or similar elastical device.

Finally, the sight or aimer may be made of metal, wood or any other suitable material and may be painted or decorated in any colour or shade; it may be in the form of a sphere, cube, arrow, egg, pyramid or any other artistical object or combination thereof which may eventually consist of an ordinary or rear view mirror or may be made luminous by the provision of a lamp or the like, or the sight may be provided with light reflecting glasses or the like or it may be coated with any luminous or phosphorescent product.

What I claim is:

1. An indicating device for the mud guards of automobiles comprising an upstanding member having a height materially elevating the upper end thereof above the mud guard of an automobile, and having means at its lower end for attaching the same flatwise against the outside edge of a mud guard.

2. An indicating device for the mud guards of automobiles comprising an upstanding member having a height materially elevating the upper end thereof above the mud guard of an automobile, an enlargement at the upper end of said member for increasing its visibility, said member having clamping means at its lower end for attaching the same flatwise against the outside edge of a mud guard of an automobile, whereby the said member is vertical and said enlargement is vertically above the edge of said mud guard.

3. An indicating device for the mud guards of automobiles comprising an upstanding member having a height materially elevating the upper end thereof above the mud guard of an automobile, an enlargement at the upper end of said indicator for increasing its visibility, a hook at the lower end of said indicator whereby said member may be positioned vertically with a lower portion opposite said hook flatwise against the mud guard and with the hook behind the flange of a mud guard, and clamping screws in said hooked end directed toward the member for clamping the member flatwise to the mud guard and position said enlargement in direct vertical line above the outside edge of the mud guard of the automobile for indicating its position to the driver.

In witness whereof I affix my signature.

OSCAR RENSONNET.